United States Patent

[11] 3,629,706

[72] Inventor Norman E. Chasek
Stamford, Conn.

[21] Appl. No. 794,680

[22] Filed Jan. 28, 1969

[45] Patented Dec. 21, 1971

[73] Assignee International Microwave Corporation
Cos Cob, Conn.

[54] STRAIGHT-THROUGH R.F. MICROWAVE COMMUNICATIONS REPEATER SYSTEM USING TUNNEL DIODE AMPLIFIER FOR CONSTANT POWER OUTPUT LEVEL

4 Claims, 3 Drawing Figs.

[52] U.S. Cl. .......... 325/9, 343/6.8

[51] Int. Cl. .......... H04b 1/59, H04b 7/14

[50] Field of Search .......... 325/1, 4, 7, 9, 13; 307/322; 330/34; 343/6.8

[56] References Cited

UNITED STATES PATENTS

| | | | |
|---|---|---|---|
| 2,017,123 | 10/1935 | Kroger | 250/17 |
| 3,480,952 | 11/1969 | Freedman | 343/6.8 |
| 2,942,197 | 6/1960 | Madsen | 328/171 |
| 3,272,996 | 9/1966 | Pan | 325/105 X |

*Primary Examiner*—Robert L. Griffin

*Assistant Examiner*—Kenneth W. Weinstein

*Attorney*—Bryan, Parmelee, Johnson & Bollinger

ABSTRACT: A straight-through radiofrequency microwave communications repeater system using tunnel diode amplifier for constant power output level in spite of changes in input power level over very wide ranges without distortion, i.e. a novel limiting action which is substantially perfect over a very wide range of input levels such as occurs by "fading" of the input signals. The output level is kept constant on an instantaneous basis independent of the input level without frequency distortion, without AM to phase modulation distortion, thus providing nearly perfect limiting action over a wide dynamic range of received signal levels. Automatic gain control is obtained without any feedback arrangements. A fail-safe action is provided by the novel arrangement of the tunnel diode amplifier modules coupled in cascaded relationship. In the illustrative embodiment a tunnel diode amplifier translator provides frequency conversion with zero db conversion loss and with a translation of the input signal by an amount of twice the frequency of the local oscillator, while the carrier signal is suppressed. Other frequency translators may be used if desired. A great reduction in the number of components is attained, while a greatly increased bandwidth capability is achieved, i.e. up to 500 megaHertz, the result of these features plus the fail-safe attributes is a tremendous increase in reliability, and an extension of commercial microwave communications into hitherto unexploited frequency realms becomes possible.

Figures 1, 2:
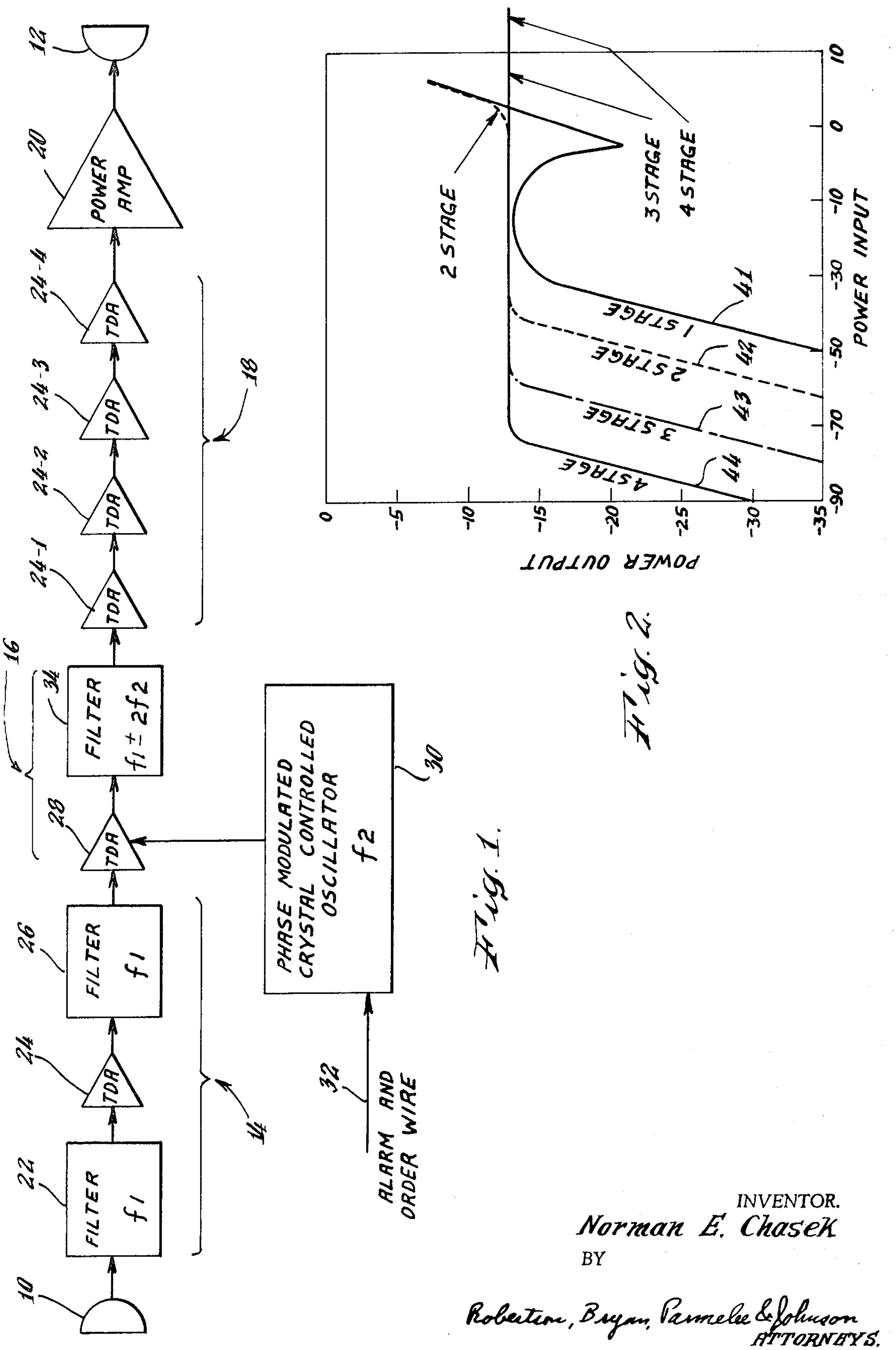

INVENTOR.
Norman E. Chasek
BY
Robertson, Bryan, Parmelee & Johnson
ATTORNEYS.

RELATIVE PHASE SHIFT VS. INPUT LEVEL IN A TUNNEL DIODE AMPLIFIER MODULE

INVENTOR.
Norman E. Chasek
BY
Roberts, Bryan, Parmelee & Johnson
ATTORNEYS.

STRAIGHT-THROUGH R.F. MICROWAVE COMMUNICATIONS REPEATER SYSTEM USING TUNNEL DIODE AMPLIFIER FOR CONSTANT POWER OUTPUT LEVEL

BACKGROUND OF THE INVENTION

Radiofrequency microwave communications repeater systems which have been used prior to this invention have for many years been subject to a number of problems. In spite of the strong desires and efforts of those active in the communications industry, many of the serious problems remain today. These problems include the great complexity of the repeater systems which means that a large number of electrical and electronic components are involved. This large number of components has greatly increased the likelihood of failure or "down time" of the various repeater systems. The likelihood of failure of a complex system is a function of the product of the statistical probability of failure of any one component. As a consequence, the utilization of a large number of components disproportionately increases the likelihood of failure or "down time" and substantially raises the expense of maintenance. The repeater systems may be located in remote or uninhabited geographic areas, which further increases maintenance expenses.

Also, the communications repeater systems which have been used have been limited in their ability to compensate for "fading" of the incoming signal due to atmospheric conditions which absorb energy from the microwave radio signals, for example, such as rain attenuation occurring between repeater stations.

The communication repeater systems which have been used prior to this invention have not only been complex, they have been limited in their bandwidth capability and been subject to distortion problems, particularly the problem of fluctuations in amplitude causing phase modulation distortion, i.e. AM (amplitude modulation) to PM (phase modulation) conversion distortion problems. For example, today among those personnel who are familiar with the field of microwave communications repeaters it is considered that a channel bandwidth of 30 or 40 megaHertz is a "very wide" bandwidth; whereas the present invention enables commercially practical microwave communications repeaters to be built having a channel bandwidth of 500 megaHertz, while also providing improved reliability and less distortion.

There are four microwave communication bands which have been specified by the Federal Communications Commission for microwave relay purposes. These communication bands are defined as follows: 3.7 to 4.2 thousand megaHertz, 5.9 to 6.8 thousand megaHertz, both of these bands have a width in the frequency spectrum of 500 megaHertz. Then there is a third communication band extending from 10.7 to 11.7 thousand megaHertz, which has a width in the frequency spectrum of 1,000 megaHertz. Finally, the fourth band has a width of 2,000 megaHertz and extends from 16 to 18 thousand megaHertz. It is understood by those skilled in the art that the band from 10.7 to 11.7 thousand megaHertz and that from 16 to 18 thousand megaHertz are theoretically very attractive for use because they offer twice and four times, respectively, the available width for use in the frequency spectrum as compared with either of the two lower frequency bands. Moreover, these upper two bands are not "crowded" with other potentially conflicting or interfering signals, whereas the two lower bands are very "crowded."

Moreover, additional theoretically attractive aspects are that the wavelengths are shorter at these upper frequencies so that the physical size of the antenna equipment and towers can be markedly reduced. This reduces the amount of material and cuts down on the weight, also reducing the "windage" on the tower and antenna equipment and reducing cost.

Nevertheless, so far as I am aware, the uppermost band (16–18 has not been used at all commercially, and the next band (10.7—11.7) is only used by a few specialized installations today. The reasons for nonuse of such theoretically very attractive bands have been the unreliability of equipment and inability to cope with gross "fading" of signals as occurs by rain attenuation in these two upper bands and by other atmospheric conditions.

It is an object of the present invention to overcome these and other problems and limitations and to offer to the communications industry novel, reliable, wide bandwidths, distortion-free and greatly simplified repeater systems which will enable microwave communications links to be utilized for more applications and will enable the extension of commercial microwave communications into frequency realms which have hitherto lain fallow.

DESCRIPTION

The present invention relates to a straight-through RF microwave communications repeater system and more particularly to such a repeater system using tunnel diode amplifier for providing constant power output level in spite of changes in input power level over a very wide range of input levels without distortion.

Among the advantages of a microwave communications repeater system embodying the present invention are those resulting from the fact that the repeater system provides a constant level of output power, i.e. a limiting action over a very wide range of input power levels, without causing any significant distortion. This advantageously perfect limiting action characteristic of this repeater system enables a power amplifier to be utilized in the output stage of the repeater which might otherwise be sensitive to the level of the signal being fed to the output power amplifier.

Another advantage of microwave communication repeater systems embodying the present invention are those resulting from the fact that the limiting action is provided over a very wide range of input signal levels with no significant AM to PM conversion distortion. In addition, the level output power response or limiting characteristics are obtained without requiring any automatic gain control circuits utilizing feedback from the output to the input stages for controlling the gain of the system. This reduces the number of electrical and electronic components present. In a communications repeater system embodying the present invention the gain control or response limiting action is obtained automatically without such complex feedback gain control arrangements. Moreover, the limiting action is instantaneous in response, without the delayed response or "overshoot" characteristics inherent in many prior art systems.

Among the further advantages provided by a microwave communications repeater system embodying the present invention, are those resulting from the fact that if any one of the amplifier modules should fail in operation, the system will nevertheless, continue to operate satisfactorily. Moreover, the defective module can be removed and the replacement plugged into the repeater system without causing any "down time" or interruption in the operation of the communications link.

By virtue of the fact that this invention provides a substantially distortion free repeater system with great bandwidth capability and a tremendously wide range of limiting action, it enables the practical utilization of the two upper bands. The problem of rain attenuation is overcome by the wide range of limiting action plus the added capability that the distortion-free action of the repeaters enables more of them to be used. The larger number of repeaters are placed closer together than conventional today, thus reducing each transmission path length, i.e. shorter "hops" with more repeaters. Therefore, in spite of gross attenuation by rain the shorter "hop" allows sufficient signal strength to reach the next repeater to meet adequate signal-to-noise level.

Even though more repeaters are utilized the overall cost of the system is not increased because of the marked reduction in components (approximately one tenth as many electrical and electronic components in each repeater). Also, the higher frequencies enable smaller size antennas and towers, as discussed above, which represents a substantial cost saving per repeater. In addition, the much greater bandwidth allows the cost of the system to be spread over and amortized by a much larger number of messages and a corresponding larger number of users. Further, the increased reliability and ease of maintenance provide additional cost savings.

Another advantage of the microwave communications repeater systems embodying the present invention are those resulting from the fact that all of the amplifier modules and the frequency translation modules comprise identical tunnel diode amplifier modules. The final stage, which may be a power amplifier stage may be a different structure. This invention makes it possible to drive high-power amplifiers, such as travelling wave tubes, which do not themselves contain distortion-free characteristics, without introducing undue distortion factors in the system. The final stage may comprise one or more frequency lock oscillators.

By virtue of the wide band characteristics of the communications repeater systems embodying the present invention, the repeater system can be arranged to handle a very wide channel bandwidth, for example up to 500 megaHertz in width.

Moreover, if desired a tunnel diode amplifier may be utilized as the frequency translator, in which case very small amounts of power are consumed in the frequency translator module. Moreover, the fact that such a frequency translator acts to suppress the carrier signal, enables the use of less complex filters, which aspect further enhances the reliability of the overall system, in systems in which it is used.

As compared with prior microwave communications repeater systems used heretofore, a communications repeater system embodying the present invention utilizes approximately one-tenth as many components as used heretofore and moreover is capable of providing at least ten times the bandwidth of prior communications repeaters.

In summary, of the many advantages of communications repeater systems embodying the present invention are those resulting from the fact that these systems keep the output power level continuously at the same value independent of fluctuations of the input power level and this output level is maintained on an instantaneous basis without frequency distortion and without amplitude modulation to phase modulation conversion. In addition, the system provides many fail-safe attributes and enables inoperative modules to be removed and replaced without subjecting the system itself to "down time."

Figure 3:
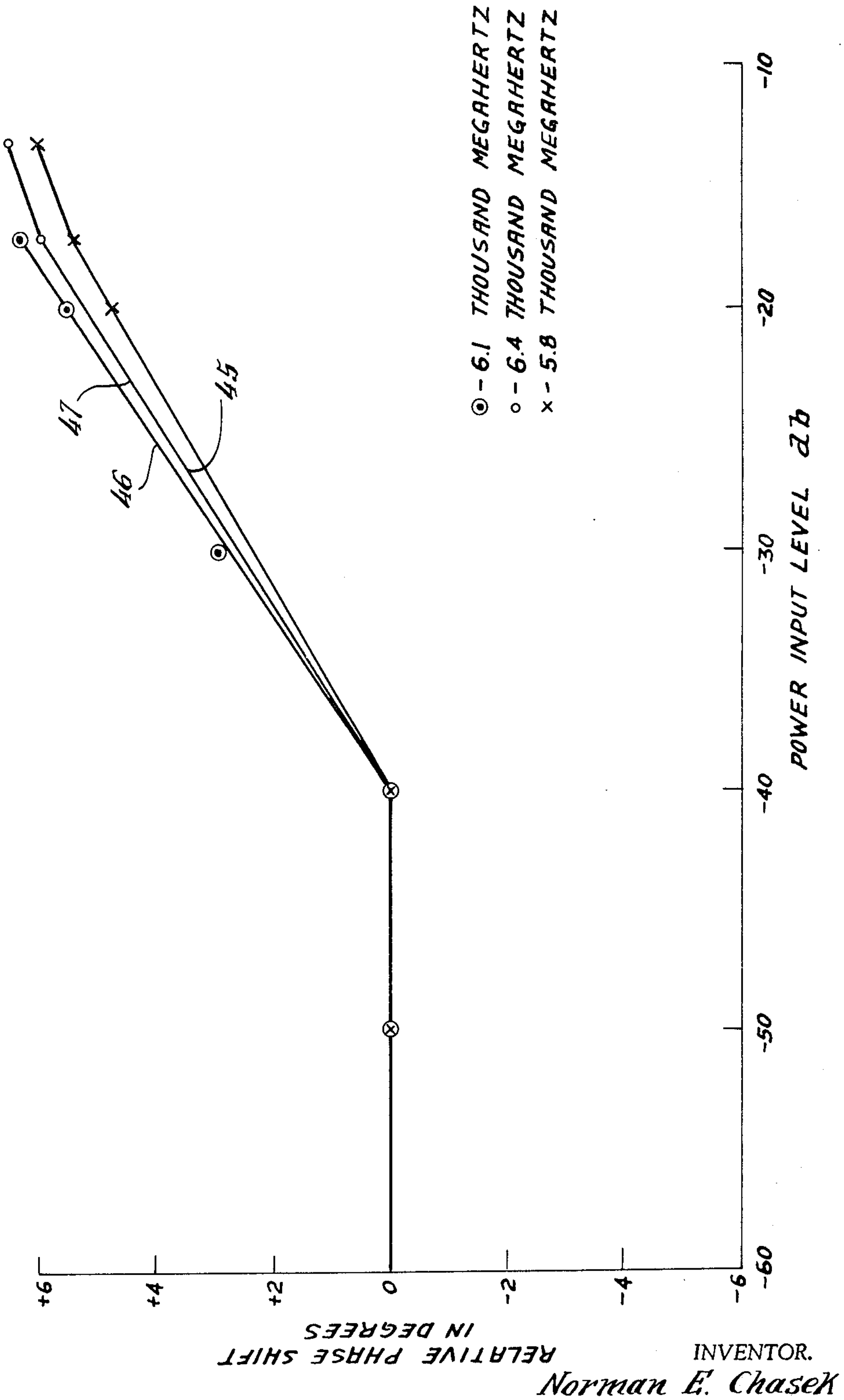

Other objects, aspects and attainments of the present invention will become apparent to those skilled in the art upon reading the following detailed description when considered in conjunction with the accompanying drawings in which there is shown and described an illustrative embodiment of this invention; it is to be understood however that this embodiment is not intended to be exhaustive nor limiting of the invention but rather it is given for purposes of illustration in order that others skilled in the art may fully understand the invention and the principles thereof and the manner of applying the invention in practical use. In the drawings:

FIG. 1 is a schematic circuit diagram of a straight-through tunnel diode R.F. microwave communications repeater system embodying the present invention;

FIG. 2 is a graph of curves of power output level plotted as a function of power input level plotted over a very wide dynamic range of input power levels. FIG. 2 will be considered in explaining certain features of a repeater system embodying the present invention, and FIG. 3 is a graph of curves of relative phase shift versus power input level for one of the tunnel diode amplifier stages, plotted at three different frequencies.

As shown in FIG. 1 a radiofrequency microwave communications repeater system embodying the present invention includes a receiving antenna 10 for receiving microwave radio signals and a transmitting antenna 12 for transmitting the signals after they have been amplified up to the desired output level. The output signals being sent from the transmitting antenna 12 are shifted to a different frequency from the input signals to prevent their being picked up in the input section. The receiving antenna 10 is aimed toward a similar repeater system, thus providing a communications link for relaying information and data over substantial distances.

The repeater system includes, generally, a low noise preamplifier section 14, a tunnel diode amplifier frequency translator section 16, a main amplifier section 18 including multiple tunnel diode amplifiers cascaded in straight-through coupled relationship, and a power amplifier output stage 20 feeding the transmitting antenna 12.

In the preamplifier section 14 there is a preselector filter 22 which is a wide band-pass filter adapted to pass all signals from the antenna 10 lying within the desired wide band of frequencies. It will be understood that the antenna 10 is of a size and configuration adapted to receive microwave radio signals throughout the full bandwidth intended to be passed by the preselector filter 22 A first tunnel diode amplifier 24, which provides preamplification of the signals received, is connected between the output of the filter 22 and the input of a second band-pass filter 26, which is identical to the first filter 22. This second filter 26 serves to provide more selectivity for preventing unwanted signals from passing through the preamplifier section 14.

The output of the second filter 26 serves as the output of the preamplifier section 14 and is coupled to the frequency translator section 16. This translator section 16 includes a tunnel diode amplifier 28 which is identical to the amplifier 24, except that the amplifier 28 is driven by the output signal of frequency $f_2$ generated by a local oscillator 30. This oscillator 30 is a phase-modulated crystal-controlled oscillator which normally feeds a signal of fixed frequency $f_2$into the translator 28. The frequency $f_2$ is outside of the bandwidth passed by the preamplifier section 14. By applying a suitable voltage bias on the translator 28 it serves to shift the incoming signal or signals by a frequency change equal to twice the frequency $f_2$ being supplied by the local oscillator 30.

If a different bias is used, then the frequency change is equal to $f_2$ instead of $2f_2$. In the following discussion it is assumed that the voltage bias has been adjusted to produce a frequency change of $2f_2$.

For example, assume that the incoming signal has a frequency $f_1$. In the translator 28 this incoming signal is changed to two sideband frequencies $f_1+2f_2$ and $f_1-2f_2$.

The reason that the translator 28 produces a frequency change equal to twice the frequency $f_2$ is that the application of the driving signal $f_2$ to the tunnel diode amplifier 28 drives this amplifier 28 into a region of operation in which there is a double phase reversal of the signal. This double phase reversal occurs during each cycle of the driving signal $f_2$ thus producing a frequency change equal to twice $f_2$ and suppressing the original carrier signal $f_1$.

The local oscillator 30 may include an input connection wire 32 which is normally inactive. This input connection 32 is for the purpose of conveying an alarm signal or a special order signal into the oscillator for phase modulating the signal $f_2$ of the local oscillator 30. The result is that the special alarm signal or order signal is then transmitted along with the regular communication signals being relayed so that the alarm or order signal can be utilized for system monitoring or control purposes.

Although a tunnel diode frequency translator 28 is shown, it is to be understood that a different type of translator may be used if desired. However, in many installations it is believed that a tunnel diode frequency translator may be used to advantage.

The output from the tunnel diode translator 28 is fed into a band-pass filter 34 (frequency-shift filter) which is centered at a frequency that is $2f_2$ above or $2f_2$ below the center frequency of the filters 22 and 26. When a translator is used such that the frequency change is twice $f_2$, the frequency-shift filter 34 can be less elaborate in construction than frequency-shift filters such as customarily used in repeater systems heretofore.

If the frequency shift in the preceding repeater system, to which the receiving antenna 10 is directed, was an increase in frequency, then the frequency shift which is used in this repeater system is a decrease in frequency, and vice versa. Assuming that a decrease in frequency is to be used, then the filter 34 is tuned to a center frequency which is $2f_2$ below the center frequency of the filters 22 and 26.

The output from the filter 34 is coupled into the main amplifier section 18 which is shown as including four identical tunnel diode amplifier (TDA) modules 24–1, 24–2, 24–3 and 24–4. These TDA modules are cascaded in tandem. It is to be noted that the repeater system should have at least three of these TDA modules cascaded in tandem. The reason for having at least three is to have gain available to compensate for "-fading." However, it is preferred to use four of such modules cascaded in tandem for reasons as explained further below.

These TDA modules are identical to the amplifier module 24 and to the translator module 28. The main amplifier section 18 constituting at least three TDA modules serves to drive the power amplifier stage 20 which includes a travelling wave tube or other microwave power-amplifying device.

A power-amplifying stage 20, such as a traveling wave tube, would be extremely sensitive to changes in amplitude, thus causing phase modulation distortion. However, as discussed above the repeater system as shown, achieves its limiting action over very wide range without phase modulation distortion. Therefore, the signals which are fed into the stage 20 are of constant amplitude and thus the stage 20 can be effectively used without encountering phase modulation distortion problems.

As shown in FIG. 2 a single tunnel diode amplifier module provides a power output to power input relationship curve as shown by a full line curve 41 labeled "1 Stage."

When a second tunnel diode amplifier module is coupled in straight-through relationship with the first, an overall relationship is provided as shown by the dotted curve 42 labeled "2 Stage." These two stages would provide a level limiting action over a range of power input level ranging from −38 db. to 0 db.

When a third tunnel diode amplifier module is coupled, in straight-through relationship with the other two, an overall relationship is then provided as shown by the dash and dotted curve 43 labeled "3 Stage." These three stages provide a constant level of output power over a range of power input from −53 db. to 10 db.

When a fourth tunnel diode amplifier is cascaded with the others, an overall response curve 44 is provided. The power output is held constant on an instantaneous basis even though the input power level should fluctuate over a tremendously wide range from −70 db. up to 20 db. a total range of 90 db.

It is noted that the power input scale in FIG. 2 below the value of −10 db. is plotted in increments of 20 db. whereas above the value of −10 db. it is plotted in increments of 10 db. The reason for the change in scale is that it provides a more compact graph while more clearly presenting the relationship described above.

In the event that one of the tunnel diode amplifier modules 24 or 24–1, 24–2, 24–3 or 24 –4 should fail, the repeater system continues operating satisfactorily with a somewhat reduced range of limiting action. When the preamplifier TDA module fails it causes an increase in the noise figure, but nevertheless the repeater continues to operate reasonably satisfactorily. If one of the TDA modules in the amplifier section 18 should fail, there is no adverse effect, because this merely reduces the number to three. As explained above three of them are enough to compensate for "fading." Thus, it is seen that the preferred number of four TDA modules cascaded in tandem provides very great reliability in operation by avoiding down time.

These TDA modules 24 and 24–1 to 24–4 are each constructed with ferrite circulators, thus providing the fail-safe operating characteristics as discussed.

Even if two or three of these TDA stages 24–1 to 24–4 should cease functioning. The repeater system would continue operating, and its reduced output level, if any, would be compensated for by the next repeater system. The next successive repeater system would respond to the reduced power input level in the same manner as it would to a severe case of "fading." Thus, there is a tremendous reliability provided in the overall system.

Any one of the tunnel diode amplifier modules 24, 24–1, 24–2, 24–3, 24–4 can be removed and replaced without interrupting the operation of the repeater system itself. Thus, replacement servicing or preventive maintenance procedures are rendered most conveniently. At any time one or more of the TDA modules 24, 24–1, 24–2, 24–3, 24–4 can be removed and replaced with new modules while the communications system continues its operation without interruption. It is only failure of the frequency translator 28, the oscillator 30 or the power amplifier 20 which would render the repeater inoperative.

To illustrate the excellent operating characteristics with respect to phase shift, attention is invited to FIG. 3 in which a typical measurement of relative phase shift is shown for any one of the tunnel diode amplifier stages 24, 24–1, 24–2, 24–3, or 24–4. The relative phase shift measurements for the curves 45, 46 and 47 were made at 5.8, 6.1 and 6.4 thousand megaHertz, respectively.

In another embodiment the power amplifier stage 20 comprises a frequency lock oscillator whose frequency locks to an injected signal from the last amplifier module 24–4. That is, the oscillator follows in slave relationship the instantaneous frequency of the driving signal from the module 24–4. This driving signal is at a power level 10 db. or even 20 db. weaker than the output power of the frequency lock oscillator. For further increase in power output a second frequency lock oscillator is connected in cascaded relationship to the first so that the output frequency of the second one locks to the output signal of the first.

Among the advantages of utilizing one or relationship frequency lock oscillators to comprise the power output stage 20 is that there is increased efficiency in electrical consumption and adjacent channel interference or crosstalk is strongly rejected.

The frequency lock oscillator may include any negative resistance amplifier, such as a tunnel diode, gun diode, avalanche diode or even a transistor device which is arranged to behave as a negative resistance amplifier.

If a sufficient number of main amplifier TDA modules are used in straight-through cascaded relationship to provide the high-quality instantaneous limiting action for the repeater system, which number is indicated as being at least three, then a different negative resistance element other than a tunnel diode may be used in the final main amplifier stage 24–4. For example a gun diode or avalanche diode may be used to provide greater amplification. If desired, a fifth module may be used in the main amplifier 16, and this might include a negative resistance diode other than a tunnel diode. However, as indicated above it is the tunnel diode amplifiers in straight-through cascaded relationship which provides the high-quality instantaneous limiting action as shown in FIG. 2, and in most cases it is advantageous to utilize four TDA modules for the fail-safe reasons discussed above.

As indicated further above, there is an advantageous relationship between the high-quality instantaneous limiting action of the straight-through cascaded TDA modules and a travelling wave tube used as the power amplifier stage 20. The result is that a signal of constant amplitude is fed into the travelling wave tubes, and hence phase modulation distortion problems are avoided.

There is also an advantageous relationship between the high-quality instantaneous limiting action of the straight-through cascaded TDA modules and one or more frequency lock oscillators used as the power amplifier stage 20. This advantageous relationship arises from the fact that in order to obtain substantial power gain from the frequency lock oscillator the driving signal supplied by the module 24–4 should be at a power level 10 db. to 20 db. less than the output from the stage 20. On the other hand, if the driving signal should drop much below this level, then it will be below the locking threshold, allowing the frequency lock oscillator to escape from control and to run free. By virtue of the high-quality instantaneous limiting action, the driving signal remains at a constant level fed into the frequency lock oscillator and hence problems of free-running oscillation are avoided while achieving a large power gain.

The terms and expressions which I have employed are used in a description and not in a limiting sense, and I have no intention of excluding such elements as are equivalents of the elements of the invention described above and as are defined within the scope of the appended claims.

What is claimed is:

1. A low-distortion R.F. microwave communications repeater systems of wide bandwidth capability comprising receiving antenna means, preamplifier means coupled to the receiving antenna means including first band-pass filter means, said preamplifier means including a negative-resistance tunnel diode amplifier attached to a circulator, frequency translator means coupled to the output of said preamplifier means for producing a frequency shift, frequency-shift band-pass filter means coupled to the output of said translator means and being turned to a center frequency displaced from the center frequency of said first band-pass filter means by an amount of said frequency shift, main amplifier means coupled to the output of said frequency-shift filter means and including at least three negative-resistance tunnel diode amplifiers each attached to a circulator, said tunnel diode amplifiers being coupled together in straight-through cascaded relationship providing a distortionless limiting action over a wide range of power input level with no significant AM to PM conversion distortion and wherein the limiting action is instantaneous in response to maintain a substantially constant instantaneous power output level, power amplifier means coupled to the output of said main amplifier means, and a transmitting antenna coupled to the output of said power amplifier means and said cascaded arrangement of at least three negative-resistance tunnel diode amplifiers providing fail safe operating characteristics such that the system will continue to operate in spite of the failure of any one of said negative resistance tunnel diode amplifiers.

2. A low-distortion, R.F. microwave communications repeater system of wide bandwidth capability as claimed in claim 1 in which said main amplifier means includes four negative-resistance tunnel diode amplifiers coupled together in straight-through, cascaded relationship.

3. A low-distortion, R.F. microwave communications repeater system of wide bandwidth capability comprising receiving antenna means, preamplifier means coupled to the receiving antenna means including first band-pass filter means, frequency translator means coupled to the output of said preamplifier means for producing a frequency shift, frequency-shift band-pass frequency means coupled to the output of said translator means and being tuned to a center frequency displaced from the center frequency of said first band-pass filter means by an amount of said frequency shift, main amplifier means coupled to the output of said frequency-shift filter means and including at least three tunnel diodes amplifier modules coupled together in straight-through cascaded relationship providing a substantially constant output power level on an instantaneous basis over a wide dynamic range independent of the input level without AM to PM conversion distortion, power amplifier means coupled to the output of said main amplifier means, said power amplifier means including at least one frequency lock oscillator whose frequency lock to the signal from the output of said main amplifier, and a transmitting antenna coupled to the output of said power amplifier means, and said instantaneous limiting action over the wide dynamic range of said main amplifier preventing said oscillator from escaping control by said driving signal.

4. A low-distortion R.F. microwave communications repeater system having wide bandwidth capability comprising receiving antenna means, preamplifier means coupled to the receiving antenna means, said preamplifier means including first band-pass filter means, frequency translator means coupled to the output of said preamplifier means for producing a frequency shift, frequency-shift band-pass filter means coupled to the output of said translator means and being turned to a center frequency displaced from the center frequency of said first band-pass filter means by an amount of said frequency shift, main amplifier means coupled to the output of said frequency-shift filter means and including at least three negative-resistance tunnel diode amplifiers, said tunnel diode amplifiers being coupled together in straight-through cascaded relationship providing an instantaneous limiting action and avoiding changes in amplitude over a wide range of power input level, power amplifier means coupled to the output of said main amplifier means, and a transmitting antenna coupled to the output of said power amplifier means, said power amplifier means including a travelling wave tube in which the phase shift through the travelling wave tube is normally sensitive to the amplitude changes of a large signal being amplified so as to produce serious distortion whenever incidental AM is present, and by virtue of the excellent instantaneous limiting action provided by at least three of said tunnel diode amplifiers coupled together in straight-through cascaded relationship such incidental AM is avoided thereby to avoid the production of distortion in said travelling wave tube.

* * * * *